Inventor:
David C. Prince,
by *Alexander S. ...*
His Attorney.

Patented June 5, 1928.

1,672,777

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

REGULATING APPARATUS.

Application filed March 13, 1926. Serial No. 94,569.

My invention relates to the transmission of current between alternating and direct current circuits, and has for its principal object the provision of a regulating apparatus whereby the voltage of one of such circuits may be maintained substantially constant irrespective of variation in the voltage of the other circuit.

It is desirable in transmitting current between alternating and direct current circuits to maintain a constant voltage on the circuit to which current is supplied. If current is supplied from the direct to the alternating current circuit, for example, the effects of variation in the voltage of the direct current circuit should be excluded from the alternating current circuit. In accordance with my invention, this result is accomplished by applying to the control or input circuits of the rectifiers connected between the direct and alternating current circuits a harmonic voltage controlled in response to variation in the voltage of the direct current circuit.

My invention will be better understood from the following description when considered in connection with the accompanying drawing and its scope will be pointed out in the appended claims.

Figure 1:
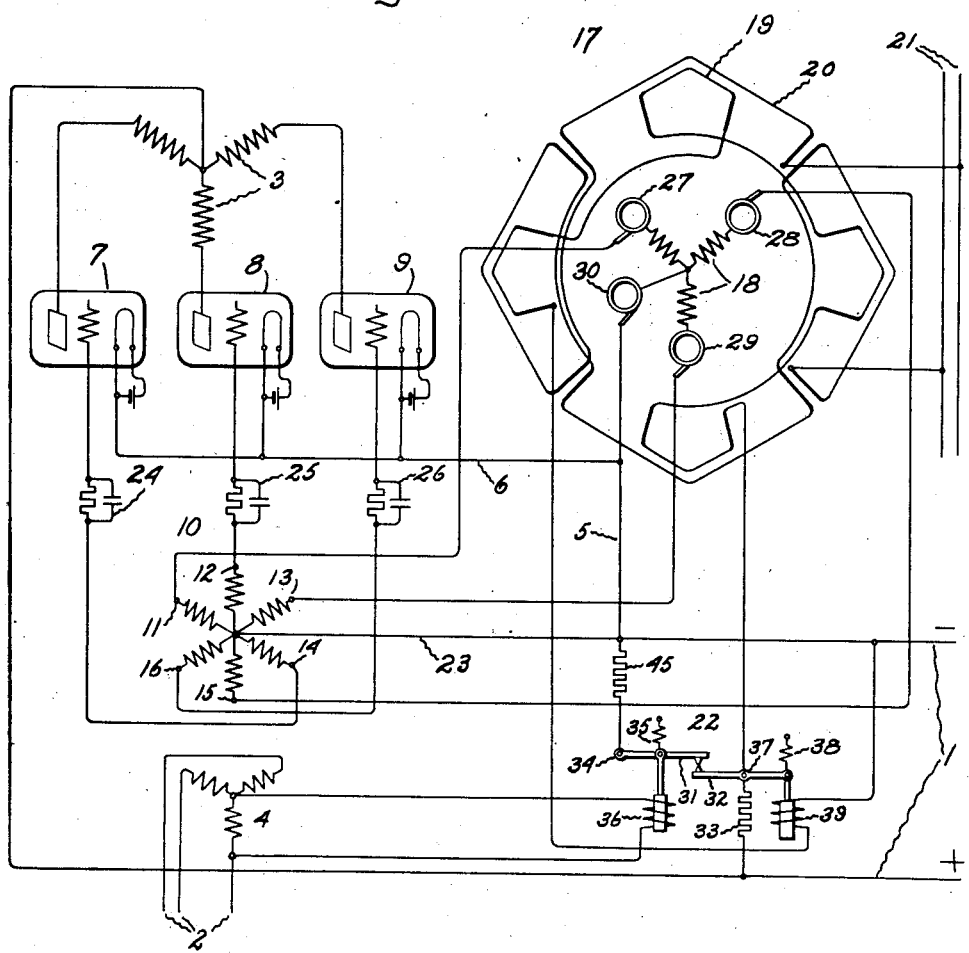
Figure 2:
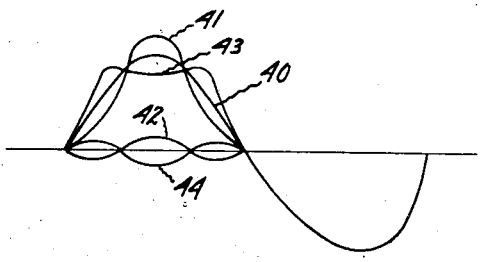

Referring to the drawing, Fig. 1 shows an apparatus wherein my invention has been embodied; and Fig. 2 is an explanatory diagram relating to the operation of this apparatus.

Fig. 1 shows a direct current circuit 1 and a polyphase alternating current circuit 2 which are interconnected through means comprising a main transformer provided with a primary winding 3 and a secondary winding 4. The negative side of the direct current circuit 1 is connected to the terminals of the primary winding 3 through conductors 5 and 6 and rectifying means shown as a plurality of thermionic devices each connected in a different lead of the polyphase winding 3 and each comprising a grid for controlling the transmission of current between its cathode and anode. The positive side of the direct current circuit 1 is connected to the neutral of the winding 3. With these connections, current from the circuit 1 is transmitted successively through the different thermionic devices and the different phases of the winding 3, and the polyphase currents induced in the secondary circuit 4 are supplied to the polyphase alternating current circuit 2.

In the illustrated embodiment of my invention, the voltage of the alternating circuit 2 is maintained substantially constant by means comprising a tertiary winding 10 which is inductively related to the primary winding 3 and is provided with terminals 12 to 16 and a machine 17 which is provided with an armature or rotor winding 18 and with stator or field windings 19 and 20 supplied with exciting current respectively from the circuit 1 and means indicated as supply busses 21. A vibratory device 22 is provided for regulating the excitation of the winding 19 in response to variation in the voltage of the circuit 1. The machine 17 is arranged to rotate freely in response to the torque produced by the currents of its various windings.

It will be observed that the grid and cathode of the thermionic device 7 are interconnected through a circuit comprising the conductors 6 and 5, the neutral connection 23 of the tertiary winding 10, the lead 14 of the winding 10, and a grid condenser and grid leak device 24; that the grid and the cathode of the thermionic device 8 are likewise interconnected through the lead 12 of the winding 10 and a grid condenser and grid leak device 25; and that the grid and cathode of the thermionic device 9 are similarly interconnected through the terminal 16 of the winding 10 and a grid condenser and grid leak device 26. The terminals 11, 13 and 15 of the winding 10 are connected to the terminals of the armature winding 18 through slip rings 27, 28 and 29 respectively. The neutral of the winding 18 is connected to the neutral of the winding 10 through a slip ring 30. With these connections, the grid potentials of the thermionic devices 7, 8 and 9 comprise component voltages dependent on the current of the windings 3 and on the excitation of the field windings 19 and 20 of the machine 17.

The regulator 22 comprises vibratory members 31 and 32 which are arranged to connect a resistor 45 to the circuit 1 in parallel with the field winding 19. The member 31 is pivoted at 34, is biased to its upper position by a spring 35 and is moved to and fro in accordance with the energization of an operating coil 36 connected to the alternating current circuit 2. The member 32 is pivoted at 37, is biased to its lower position by a spring 38, is connected to the positive side of the circuit 1 through a resistor 33, and is moved to and fro in accordance with the energization of an operating coil 39 which is connected to the direct current circuit 1 in series with the field winding 19.

Fig. 2 shows a sine curve 40, a high peaked curve 41 that is produced by combining with the sine curve 40 a third harmonic represented by the curve 42, and a flat topped curve 43 that is produced by combining with the sine curve 40 a third harmonic represented by the curve 44.

It is known that a fairly definite relation exists between voltages of direct and alternating current circuits which are interconnected through a rectifying apparatus. Thus if the sine curve 40 be considered to represent the voltage of the alternating current circuit 2, the amplitude of this curve will be varied by variation in the voltage of the direct current circuit 1. This variation in voltage of the alternating current circuit may be prevented by applying to the winding 10 through its neutral connection harmonic voltages properly related both in phase and frequency to the voltage which would be induced in the secondary circuit 4 if no regulating apparatus were provided. No harmonics will appear in the alternating circuit 2 if this is a three phase circuit and triple harmonics are thus introduced through the neutral connections of the tertiary winding 10. In the described embodiment of the invention, these harmonics are produced by the machine 17.

The field winding 20 of the machine 17 is arranged to produce four poles and is excited by current supplied from a suitable constant potential source through busses 21. The field winding 19 of this machine is arranged to cooperate with the winding 20 to produce twelve poles. These field windings are suitably proportioned to produce a third harmonic which will cause the production of either a peaked or flat topped voltage wave depending on whether the voltage of the direct current circuit 1 is above or below its normal value.

The excitation of the winding 19 is regulated by the regulator 22. If the voltage of the direct current circuit 1 decreases below its normal value, the vibratory member 32 is moved downward, the vibratory member 31 is moved upward due to the tendency of the alternating current circuit voltage to decrease and the winding 19 is connected to the circuit 1 independently of the impedance device 45 a large proportion of the time, thus maintaining the excitation of the winding 19 at a comparatively high value and causing the production of a third harmonic voltage which increases the voltage that would otherwise be applied to the alternating current circuit. The third harmonic voltage produced under these conditions corresponds in a general way to that represented by the curve 42.

When the voltage of the direct current circuit is normal, the vibratory members 31 and 32 engage one another a sufficient proportion of the time to maintain on the alternating current circuit a voltage corresponding to the sine curve 40, for example.

If the voltage of the direct current circuit exceeds its normal value, the vibratory members are moved into engagement with one another and the impedance device 45 is connected to the circuit 1 in parallel with the field winding 19 a larger proportion of the time, thus decreasing the excitation of the winding 19 and causing the production of a third harmonic voltage which corresponds in general to the curve 44 of Fig. 2 and has the effect of decreasing the voltage that would otherwise be applied to the alternating current circuit. The alternating current circuit voltage is thus maintained at a value corresponding very closely to that represented by the sine curve 40. It will of course be understood that the members 31 and 32 are in more or less constant vibration and that the excitation of the winding 19 and the type of harmonic voltage produced is dependent on the proportion of the time that the impedance device 45 is connected in shunt to the field winding 19 by the vibratory members 31 and 32.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:

1. The combination of direct and alternating current circuits, a transformer connected between said circuits, electric valve apparatus provided with an anode and cathode connected between said circuits in series with said transformer and with a grid for controlling the transmission of current between said cathode and anode, a winding connected between said cathode and grid for controlling the potential of said grid in response to the potential of said transformer, and means for applying to said winding harmonic voltages whereby variations in the voltage of said alternating current circuit are avoided.

2. The combination of direct and alternating current circuits, a transformer comprising a secondary winding connected to said alternating current circuit and a primary winding having its neutral connected to one side of said direct current circuit, a rectifier provided with an anode and a cathode connected between a terminal of said primary winding and the other side of said direct current circuit and with a grid for controlling the transmission of current between said cathode and anode, a tertiary winding inductively related to said primary winding and connected between said cathode and grid for controlling the potential of said grid, and means for applying to said tertiary winding harmonic voltages whereby the voltage of said alternating current circuit is maintained constant irrespective of variation in the voltage of said direct current circuit.

3. The combination of direct and alternating current circuits, means comprising an electric valve provided with a cathode and an anode connected between said circuits and with a grid for controlling the transmission of current between said circuits, a machine provided with a winding for controlling the potential of said grid and with a plurality of field windings, and means for regulating the excitation of one of said windings in accordance with an electrical condition of one of said circuits.

4. The combination of direct and alternating current circuits, means comprising an electric valve provided with a cathode and an anode connected between said circuits and with a grid for controlling the transmission of current between said circuits, a machine provided with a winding for controlling the potential of said grid and with a plurality of field windings arranged to produce different numbers of poles, and means for regulating the excitation of one of said windings in accordance with the voltage of one of said circuits.

5. The combination of direct and alternating current circuits, means comprising an electric valve provided with a cathode and anode connected between said circuits and with a grid for controlling the transmission of current between said circuits, means for applying harmonic voltages to said grid, and means for regulating said harmonic voltages in accordance with an electrical condition of one of said circuits.

6. The combination of direct and alternating current circuits, means comprising an electric valve provided with a cathode and anode connected between said circuits and with a grid for controlling the transmission of current between said circuits, means for applying harmonic voltages to said grid, and means operable to regulate the potential of said grid in accordance with the voltage of one of said circuits.

In witness whereof, I have hereunto set my hand this 11th day of March, 1926.

DAVID C. PRINCE.